UNITED STATES PATENT OFFICE.

ABRAHAM S. OLIN, OF ST. LOUIS, MISSOURI, ASSIGNOR TO THREE KAYS CARBON COMPOUND COMPANY, OF ST. LOUIS, MISSOURI, A CORPORATION OF MISSOURI.

COMPOSITION FOR PULVERIZING CARBON.

1,116,614. Specification of Letters Patent. Patented Nov. 10, 1914.

No Drawing. Application filed February 5, 1914. Serial No. 816,829.

*To all whom it may concern:*

Be it known that I, ABRAHAM S. OLIN, a citizen of the United States, residing in the city of St. Louis and State of Missouri, have invented a new and useful Composition for Pulverizing Carbon, of which the following is a specification.

This invention relates to a composition of matter for the purpose of penetrating and removing hardened or soft carbons from engines and other kinds of machinery upon which carbons frequently accumulate.

The composition is liquid in form, and consists of a number of liquids mixed together in the proportions hereinafter stated. The composition formed with the ingredients and in the proportions hereinafter specified remains permanently commingled, and the various ingredients do not separate into layers in the container, as occurs in the case of other compositions for similar purposes.

The mixture comprises the following ingredients in the proportions stated, and mixed in the order hereinafter described: alcohol 25%, ether 18.10%, chloroform 1.25%, turpentine 1.25%, acetic acid 1.25%, ammonia (28% solution) 19.55%, water 33.60%.

The alcohol, ether and turpentine should be thoroughly mixed together in the proportions stated before the other parts are added, thus enabling the turpentine and ether to become thoroughly mixed with the alcohol as a mixture before including the additional ingredients. The acetic acid should be thoroughly mixed with the ammonia in the proportions stated so as to form a thorough mixture of these two ingredients before being added to the mixture of ether, turpentine and alcohol. The mixture of the acetic acid and ammonia should then be added to the mixture of alcohol, ether and turpentine and said several ingredients should be thoroughly mixed by agitation, and while the mixture is being agitated the water and chloroform should be added and mixed therewith by agitation, thus completing the mixture of all of the ingredients.

The ingredients mixed in the order stated remain thoroughly mixed under normal conditions, and do not separate into different layers as is frequently the case with other compositions which do not include all of the ingredients herein named.

The mixture thus formed readily enters into and softens hardened carbon, and reduces the carbon substantially to a powdered or pulverized condition in which it may readily be removed. I have also found that the mixture readily pulverizes or powders soft carbon so that it may also be easily and readily removed. The acetic acid and ammonia render the mixture a solvent for some of the elements in the carbon, and the turpentine and chloroform render the entire mixture of a strongly penetrative character; thus the qualities of the entire mixture are of a solvent and penetrating nature which results in pulverizing or powdering the deposits to which the mixture is properly applied.

I claim.

1. A composition for pulverizing carbon, the constituent elements of which are alcohol 25%, ether 18.10%, chloroform 1.25%, turpentine 1.25%, acetic acid 1.25%, ammonia 19.55%, and water 33.60%.

2. A composition for pulverizing carbon, the constituent ingredients of which are alcohol 25%, ether 18.10%, and turpentine 1.25% thoroughly mixed by agitation and after being mixed added to a mixture of acetic acid, ammonia, alcohol, ether and turpentine, chloroform 1.25% and water 33.60%.

In witness whereof, I have signed this specification in the presence of two subscribing witnesses.

ABRAHAM S. OLIN.

Witnesses:
S. CLARE,
R. M. LAWRENCE.